United States Patent [19]

Coss

[11] Patent Number: 5,427,475
[45] Date of Patent: Jun. 27, 1995

[54] TRENCHLESS PIPELINE INSTALLATION METHOD AND APPARATUS EMPLOYING CORRECTIVE ALIGNMENT OF PILOT HOLE

[76] Inventor: Timothy R. Coss, P.O. Box 7367, Boulder, Colo. 80306-7367

[21] Appl. No.: 199,715

[22] Filed: Feb. 22, 1994

[51] Int. Cl.⁶ .............................................. F16L 1/028
[52] U.S. Cl. ..................................... 405/184; 175/53; 175/62; 405/154
[58] Field of Search ................... 405/154, 184; 175/53, 175/61, 62

[56] References Cited

U.S. PATENT DOCUMENTS

| | | | |
|---|---|---|---|
| 2,796,129 | 6/1957 | Brandon | 166/9 |
| 3,180,687 | 4/1965 | Horton | 299/15 |
| 3,452,545 | 7/1969 | Malloy | 61/35 |
| 3,482,641 | 12/1969 | Atkins et al. | 175/53 X |
| 3,905,431 | 9/1975 | Hasewend | 175/53 |
| 4,043,136 | 8/1977 | Cherrington | 175/53 X |
| 4,422,800 | 12/1983 | Parish | 405/184 |
| 4,442,896 | 4/1984 | Reale et al. | 166/278 |
| 4,943,189 | 7/1990 | Verstreten | 405/267 |

OTHER PUBLICATIONS

"Trenchless Pipeline Replacement Methods With The TRS Hydrahaul System"–4 pages.

*Primary Examiner*—David H. Corbin
*Attorney, Agent, or Firm*—John R. Flanagan

[57] ABSTRACT

A corrective trenchless pipeline installation method basically includes the operational steps of, first, forming a substantially irregular initial pilot hole underground in earthen matter between a pair of spaced entry and exit pits formed in the earthen matter, second, reforming the substantially irregular initial pilot hole into a substantially straight corrected pilot hole, third, reaming the corrected pilot hole to provide an expanded straight pilot hole, and, fourth, pulling a pipeline through the expanded corrected pilot hole. In reforming the irregular initial pilot hole to the straight corrected pilot hole a cutter blade is concurrently reciprocated back and forth through the irregular pilot hole and rotated relative to the irregular pilot hole to form the corrected straight pilot hole therefrom.

18 Claims, 2 Drawing Sheets

TRENCHLESS PIPELINE INSTALLATION METHOD AND APPARATUS EMPLOYING CORRECTIVE ALIGNMENT OF PILOT HOLE

BACKGROUND OF THE INVENTION

1. Field of the Invention

The present invention generally relates to pipeline installation and, more particularly, is concerned with a trenchless method and for accurate installation of a pipeline in which corrective alignment of an initial inaccurate pilot hole is carried out before pipeline installation take place.

2. Description of the Prior Art

In the traditional way of laying a new underground pipeline system, a deep trench is normally first dug along the route planned for the pipeline system. Next, the pipeline is laid in the trench. Then, after the pipeline is so laid, the trench is filled in and the original surface restored. Significant disruption to neighborhoods, traffic flow, business operations and public convenience is experienced by this traditional trenching method of laying a new underground pipeline.

In the replacement of old underground pipelines with new pipelines, a trenchless method has been developed which substantially avoids having to dig up and then restore the surface. The trenchless pipeline replacement method utilizes the old pipeline to be replaced as a pilot hole for guiding an installation tool for either bursting or extracting the old pipeline and installing the new pipeline in its place. At most, the only excavation necessary is the digging of spaced pits for insertion (and, in some instances, extraction) of pipeline, disconnection and reconnection of adjacent service lines and placement of boring drive machines. As an example, when replacing an existing watermain on a typical residential block about 150 meters in length, the total length of the pipeline route which has to be excavated for the machine, insertion/extraction and service pits is around 20 to 25 meters. This leaves about 85% of the pavement along the pipeline route undisturbed.

These two principal trenchless methods are suited primarily for pipeline replacement in which the old pipeline laid by the trenching method is used as the pilot or guide hole. Various approaches have been devised to apply the trenchless method to the laying of a new, original (as opposed to replacement) pipeline system. These approaches, commonly known as directional drilling, rod pushing, air piercing and microtunneling, involve placing a pilot hole insertion machine either on the surface or in an entry pit to drive an insertion tool to produce a pilot hole from the entry pit to the exit pit. After reaching the exit pit, the pilot hole insertion tool is retracted from the pilot hole while a string of drive rods from a drive unit are advanced along the pilot hole to the entry pit. Once the drive rod string reaches the entry pit, an enlargement tool is attached to the drive rod string and the tool is pulled back to the exit pit, opening up the pilot hole and installing the new pipeline behind it, as in the pipe bursting or pipe extraction method of trenchless pipeline replacement.

However, a serious drawback of the aforementioned approaches is that the conventional machines typically used are unable to produce the pilot hole with the accuracy needed for the centerline of the pilot hole to meet grade requirement for gravity flow distribution systems, such as sewerlines. Thus, in new construction projects, the more costly, traditional trenching method typically must be used.

Consequently, a need exists for improvement of the aforementioned conventional approaches so as to overcome the drawback described above with respect to the lack of accuracy in producing the pilot hole.

SUMMARY OF THE INVENTION

The present invention provides a corrective trenchless pipeline installation method designed to satisfy the aforementioned need. The corrective trenchless pipeline installation method of the present invention improves the aforementioned conventional approaches by introducing another step after the initial pilot hole installation step and before the final pipeline installation step in which the irregularities in the alignment, such as caused by undulations, bends and dips, of the pilot hole are corrected.

The irregular alignment of the initial pilot hole is corrected by removing the undulations, bends and dips, in the earthen material defining the pilot hole. The bends and dips are removed by, first, inserting a saw or cutter blade through the irregular pilot hole and, then, by reciprocally and rotationally moving the cutter blade relative to the bends and dips so as to cut the earthen material and reform or remake a corrected pilot hole which is substantially straight on line and grade as per specifications. As the cutter blade is so moved, its one end is held at the desired entry point of the corrected pilot hole in the entry pit while its opposite end is forced to move to the desired opposite exit point of the corrected pilot hole in the exit pit so that all earthen material between the irregular original pilot hole and corrected straight pilot hole is cut through.

Once the corrected straight pilot hole has been completed, the cutter blade is then either connected to a drive rod string or directly to an installation tool and new pipeline and then removed from the pilot hole as it concurrently pulls in the drive rod string or installation tool by using the conventional trenchless insertion techniques.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
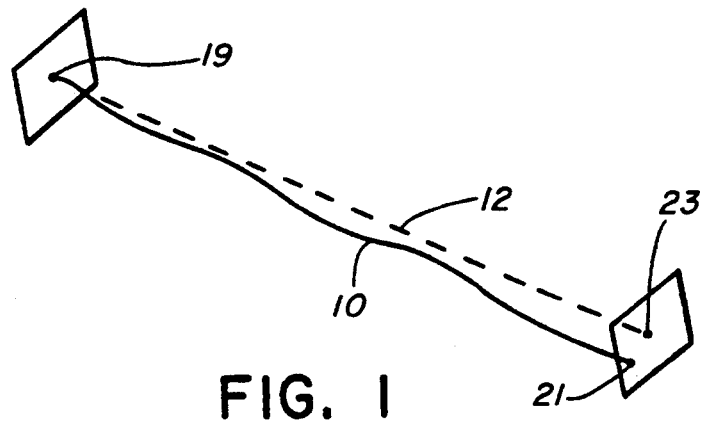
FIG. 1 is a perspective view of an underground irregular pilot hole and of an underground corrected straight pilot hole reformed from the irregular pilot hole by the corrective trenchless pipeline installation method of the present invention.

Referring to the drawings and particularly to FIG. 1, there is illustrated an underground irregular pilot hole 10 and an underground corrected straight pilot hole 12 reformed by modified pilot hole insertion machines from the irregular pilot hole 10 in accordance with the corrective trenchless pipeline installation method of the present invention. It should be understood the characterization of the corrected pilot hole 12 as being "straight" means "substantially" straight and not "perfectly" straight. A substantially straight corrected pilot hole as defined herein is one which is more straight than the initial irregular pilot hole 10 and which may have a slight downward sag in the middle due to the force of gravity acting on the physical means used by the corrective method and apparatus for reforming the pilot hole.

Figure 3:
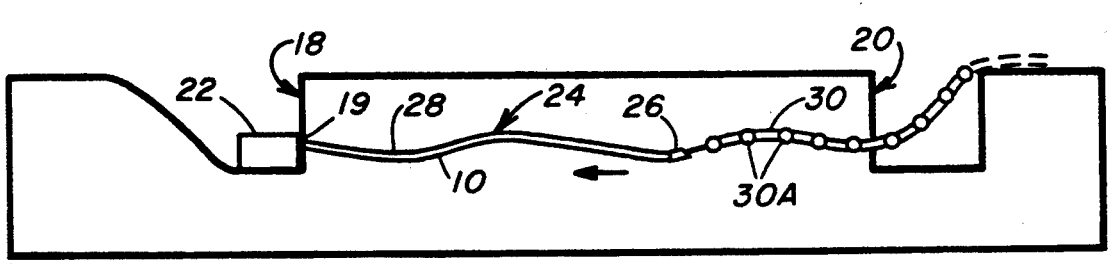
FIG. 3 is a vertical sectional view of the portion of the earth wherein replacement of the pilot hole insertion tool by a cutter blade is being carried out in accordance with the method.
Figure 4:
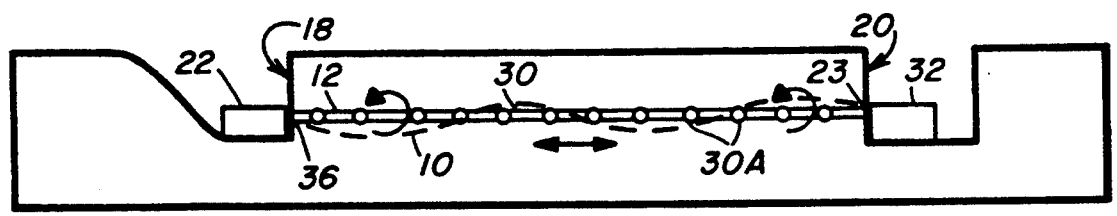
FIG. 4 is a vertical sectional view of the portion of the earth wherein corrective reformation and alignment of the irregular underground pilot hole into a corrected straight pilot hole is being carried out by use of the cutter blade in accordance with the method.
Figure 5:
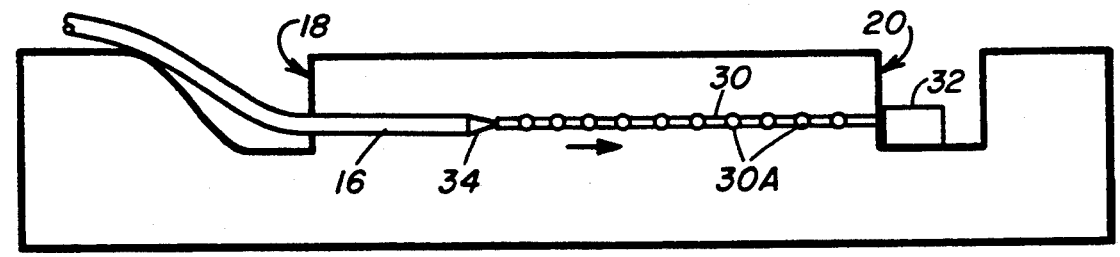
FIG. 5 is a vertical sectional view of the portion of the earth wherein removal of the cutter blade from the corrected pilot hole and replacement thereof by an installation tool and pipeline is being carried out after completion of correction of the corrected pilot hole in accordance with the method.

Referring to FIGS. 2–5, there is schematically illustrated the operational steps of the corrective trenchless pipeline installation method of the present invention. The method includes the basic steps of forming the initial substantially irregular pilot hole 10 underground (FIG. 2), reforming the initial irregular pilot hole 10 into the substantially straight corrected pilot hole 12 (FIGS. 3 and 4), and concurrently producing an expanded straight pilot hole 14 and pulling a pipeline 16 through it (FIG. 5).

Figure 2:
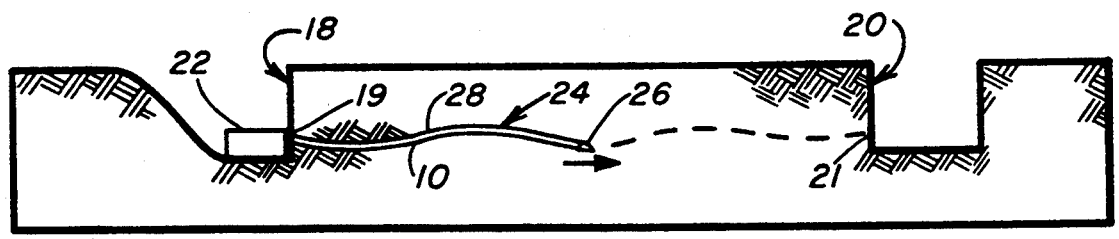
FIG. 2 is a vertical sectional view of a portion of earth wherein the formation of the initial irregular underground pilot hole is being carried out by a pilot hole insertion tool in accordance with the corrective trenchless pipeline installation method of the/present invention.

Referring to FIG. 2, there is illustrated the forming of the substantially irregular initial pilot hole 10 underground in the earthen matter between a pair of spaced entry and exit pits 18, 20 made in the earthen matter. To form the irregular initial pilot hole 10, a pilot hole insertion machine 22 is placed in the entry pit 18 and is used to form, for example, to bore, the pilot hole 10 from the entry pit 18 pit to the exit pit 20 by extending an insertion tool 24, for example, a drilling head 26 and drilling rods 28, from the insertion machine 22. As seen in FIG. 1, boring the initial pilot hole 10 by extending the drill string 24 from the insertion machine 22 causes the pilot hole to enter the earthen matter on the desired premeasured line and grade by entering the undergound at the desired entry point 19 from the entry pit 18. However, thereafter the normal operation of the drill string 24 will inherently cause irregularities to be produced in the initial pilot hole 10 in the form of undulations, bends and dips along the longtudinal extent of the pilot hole 10 as the pilot hole 10 progresses toward the exit pit 20. The portions of the initial pilot hole 10 are thus substantially offset from a desired straight line between the entry and exit pits 18, 20 and the actual exit point 21 is offset from the desired exit point 23. Hence, the initial pilot hole 10, as seen in FIGS. 1 and 2, is referred to as a substantially "irregular" pilot hole.

Referring to FIGS. 3 and 4, there is illustrated the reforming of the substantially irregular initial pilot hole 10 into the substantially straight corrected pilot hole 12. As shown in FIG. 3, the reforming step first includes withdrawing the drill string 24 from the irregular pilot hole 10 and concurrently inserting a cutter blade 30 through the irregular pilot hole 10. The cutter blade 30 is temporarily connected to the drilling head 26 of the drill string 24 so as to be pulled through the irregular pilot hole 10 as the drill string 24 is withdrawn therefrom by the insertion machine 22.

Then, as shown in FIG. 4, once the cutter blade 30 is completely inserted through the initial pilot hole 10, the ends of the cutter blade 30 respectively coupled in the entry pit 18 to the one insertion machine 22 and in the exit pit 20 to a modified insertion machine 32 to be described later on with reference to FIG. 6.

Reforming the irregular pilot hole 10 into the corrected pilot hole 12 involves operating the insertion machines 22, 32 in unison to concurrently rotate the cutter blade 30 about its own longitudinal axis relative to the irregular pilot hole 10 and, while maintained under tension, to reciprocate the cutter blade 30 back and forth through the irregular pilot hole 10.

As shown in FIG. 5, the reforming step is concluded by withdrawing the cutter blade 30 upon completion of the corrected pilot hole 12. In view that the cutter blade 30 is preferably constructed from a string of drill rods with cutter elements 30A welded thereon, the cutter blade 30 is also used to pull into and through the corrected pilot hole 12 an installation tool 34, such as a back reamer or a soil expander cone, attached to the cutter blade 30 as the cutter blade 30 is withdrawn from the corrected pilot hole 12. The installation tool 34 pulls the pipeline 16 with it and expands the corrected pilot hole into the expanded straight pilot hole 14. Alternatively, if the cutter blade 30 is a cable or wire of insufficient strength to pull in the installation tool 34 and pipeline 16, then a drive rod string may need to be pulled through the corrected pilot hole 12 before the installation tool 34 can be inserted.

Figure 7:
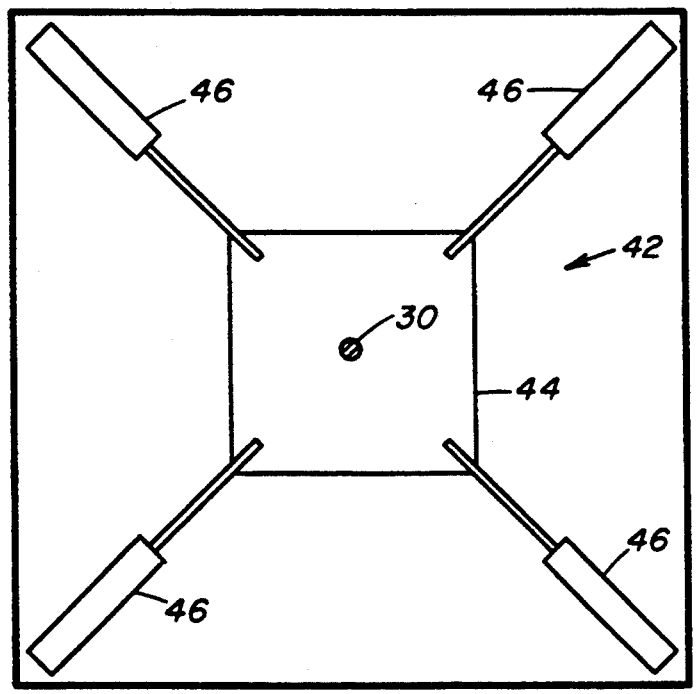
FIG. 7 is an end elevational view of a steering mechanism for moving and placing an exit end of the cutter blade at a desired point where it is desired that the corrected pilot hole exit into the exit pit.
Figure 6:
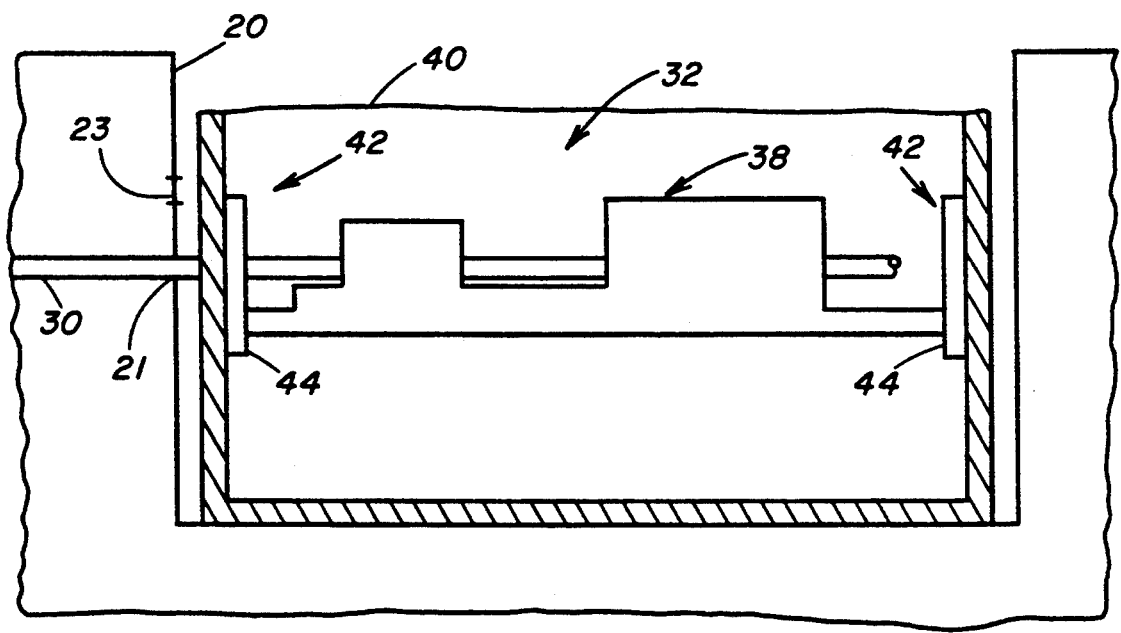
FIG. 6 is an enlarged side elevational view of an insertion machine for reciprocating and rotating the cutter blade.

Referring to FIG. 6, there is shown one example of a suitable basic machine for implementing the pilot hole insertion machines 22, 32 for producing the initial irregular pilot hole 10 and then for rotatably and reciprocally driving the cutter blade 30 for producing the corrected pilot hole 12. It should be noted that only one of the machines, such as the modified one 32 disposed in the exit pit 20, needs to be capable of rotatably driving the cutter blade 30. The other machine 22 can have a universal joint 36 coupled with the end of the cutter blade 30 which permits that end to freely rotate while only the opposite end needs to be driven. Also, only the one machine 32 needs to be modified to cause the exit point of the bore hole to move from the actual exit point 21 to the desired final exit point 23. As seen in FIG. 6, the drive mechanism 38 of this machine which generates the rotational and reciprocal motions is positioned in a shoring box 40 disposed in the exit pit 20 and incorporates a suitable steering mechanism 42, such as shown in FIG. 7, having a central fixture 44 attached to the end of the cutter blade 30 and supported a symmetrical arrangement of hydraulic actuators 46 which can be operated in a coordinated manner by suitable means, such as a control stick (not shown) used on back hoes and the like, to forceably move the central fixture 44 and its center and therewith the cutter blade laterally and into alignment with the desired exit point 23 of the corrected bore hole 12. One commercially available machine which can be used to implement the insertion machines 22, 32 is known as the GRUNDOMOLE from TT Technologies, Inc. of Aurora, Ill, USA; another machine is known as the Power Ram Model 2020 from Power Ram Corporation of Barron, Wis., USA. Thus, except for the steering mechanism 42 shown in FIGS. 6 and 7, the insertion machines 22, 32 employed by the installation method of the present invention are per se well known to one of ordinary skill in this art. The drive mechanism 38 of the insertion machines 22, 32 which operates to generate both rotational and reciprocal movements of the insertion tool 24 and cutter blade 30 are well understood by one of ordinary skill in this art. In view that these insertion machines 22, 32 are conventional and well-known as evidenced by the references to several commercially available machines cited above, the incorporation herein of a detailed illustration and description of the components of their drive mechanism 38 is not necessary to enable one of ordinary skill in this art to gain a complete and thorough understanding of the corrective trenchless pipeline installation method of the present invention whose steps have been illustrated and described herein in detail. Rather, the incorporation of such additional illustration and description of the components of the drive mechanism 38 herein would more likely complicate the achievement of such understanding by obfuscating the simplicity of the installation method of the present invention.

The cutter blade 30 can have various suitable configurations for cutting through earthen matter to form the new corrected pilot hole 12. Some examples are disclosed and illustrated in U.S. Pat. No. 3,452,545 to Malloy, the disclosure of which is incorporated by reference herein. For example, the cutter blade 30 can be a modified drill rod or a wire rope having cutter elements, such as protrusions, teeth, or screw threads, formed thereon and spaced longitudinally therealong for engaging and displacing the earthen matter.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A corrective trenchless pipeline installation method, comprising the steps of:
   (a) forming a trenchless initial pilot hole underground along a first line extending from an entry point to an actual exit point wherein the first line of the initial pilot hole is substantially irregular compared to a desired second line of a trenchless corrected pilot hole which is substantially straight and extends from substantially the same entry point to a desired exit point displaced laterally from the actual exit point; and
   (b) reforming the initial pilot hole into the corrected pilot hole.

2. The method of claim 1 wherein said forming step includes:
   providing a pair of spaced entry and exit pits formed in the earthen matter adjacent to the entry point and the actual and desired exit points;
   placing a bore hole insertion machine in the entry pit; and
   forming the initial pilot hole from the entry pit to the exit pit by advancing an insertion tool to the exit pit from the insertion machine in the entry pit.

3. The method of claim 2 wherein said reforming step includes:
   withdrawing the insertion tool from the initial pilot hole; and
   concurrently inserting a cutter blade through the initial pilot hole.

4. The method of claim 3 wherein said cutter blade is temporarily connected to the insertion tool for pulling the cutter blade through the initial pilot hole as the insertion tool is withdrawn therefrom.

5. The method of claim 3 wherein said reforming step further includes reciprocating the cutter blade back and forth through the initial pilot hole to form the corrected pilot hole therefrom.

6. The method of claim 5 wherein said reforming step further includes rotating the cutter blade relative to the initial pilot hole concurrently with the reciprocating thereof to form the corrected pilot hole therefrom.

7. The method of claim 6 wherein said reforming step further includes:
   withdrawing the cutter blade upon completion of the corrected pilot hole; and
   concurrently inserting an installation tool so as to enlarge the corrected pilot hole.

8. The method of claim 7 wherein said installation tool is connected to the cutter blade for pulling the installation tool through the corrected pilot hole as the cutter blade is withdrawn therefrom.

9. The method of claim 7 wherein said inserting the installation tool also includes concurrently pulling a pipeline through the expanded corrected pilot hole.

10. The method of claim 9 wherein said installation tool is a reaming head is connected to and pulled through the corrected pilot hole as the cutter blade is withdrawn therefrom.

11. The method of claim 7 further comprising:
    pulling a pipeline through the expanded corrected pilot hole by connecting the pipeline to installation tool and pulling the pipeline through the corrected pilot hole with the installation tool.

12. The method of claim 6 wherein said reforming step further includes moving the cutter blade laterally relative to the actual exit point of the initial pilot hole and into alignment with the desired exit point of the corrected pilot hole.

13. A corrective trenchless pipeline installation method, comprising the steps of:
    (a) forming a trenchless initial pilot hole underground in earthen matter between a pair of spaced entry and exit pits formed in the earthen matter, the initial pilot hole extending along a first line from an entry point adjacent to the entry pit to an actual exit point adjacent to the exit pit wherein the first line of the initial pilot hole is substantially irregular compared to a desired second line of a trenchless corrected pilot hole which is substantially straight and extends from substantially the same entry point to a desired exit point displaced laterally from the actual exit point;
    (b) reforming the initial pilot hole into the corrected pilot hole;
    (c) enlarging the corrected pilot hole to provide an expanded straight corrected pilot hole; and (d) pulling a pipeline through the expanded pilot hole.

14. The method of claim 13 wherein said reforming step further includes concurrently reciprocating a cutter blade back and forth through the initial pilot hole and rotating the cutter blade relative to the initial pilot hole to form the corrected pilot hole therefrom.

15. The method of claim 13 wherein said reforming step further includes:
    withdrawing the cutter blade upon completion of the corrected pilot hole; and
    concurrently inserting an installation tool so as to enlarge the corrected pilot hole.

16. The method of claim 15 wherein said installation tool is connected to the cutter blade for pulling the installation tool through the corrected pilot hole as the cutter blade is withdrawn therefrom.

17. The method of claim 16 wherein said inserting the installation tool also includes concurrently pulling the pipeline through the expanded corrected pilot hole.

18. The method of claim 14 wherein said reforming step further includes moving the cutter blade laterally relative to the actual exit point of the initial pilot hole and into alignment with the desired exit point of the corrected pilot hole.

* * * * *